United States Patent
Vijayaraghavan et al.

(10) Patent No.: US 11,586,473 B2
(45) Date of Patent: *Feb. 21, 2023

(54) METHODS AND APPARATUS FOR ALLOCATING A WORKLOAD TO AN ACCELERATOR USING MACHINE LEARNING

(71) Applicant: Intel Corporation, Santa Clara, CA (US)

(72) Inventors: Divya Vijayaraghavan, Los Altos, CA (US); Denica Larsen, Portland, OR (US); Kooi Chi Ooi, Bukit Gambir (MY); Lady Nataly Pinilla Pico, El Dorado Hills, CA (US); Min Suet Lim, Gelugor Penang (MY)

(73) Assignee: INTEL CORPORATION, Santa Clara, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/317,679

(22) Filed: May 11, 2021

(65) Prior Publication Data

US 2021/0406085 A1 Dec. 30, 2021

Related U.S. Application Data

(63) Continuation of application No. 16/146,845, filed on Sep. 28, 2018, now Pat. No. 11,030,012.

(51) Int. Cl.
*G06F 9/50* (2006.01)
*G06N 3/08* (2023.01)
(Continued)

(52) U.S. Cl.
CPC .......... *G06F 9/5044* (2013.01); *G06F 9/5027* (2013.01); *G06F 11/3024* (2013.01);
(Continued)

(58) Field of Classification Search
CPC .......................... G06F 9/5044; G06F 11/3024
See application file for complete search history.

(56) References Cited

U.S. PATENT DOCUMENTS 11,030,012 B2   6/2021  Vijayaraghavan et al.
2011/0072234 A1 3/2011  Chinya et al.
(Continued)

FOREIGN PATENT DOCUMENTS

CN   110968423 A    4/2020
DE   102019122935 A1 4/2020

OTHER PUBLICATIONS

Kenneth O'Neal, Predictive Modeling for CPU, GPU, and FPGA Performance and Power Consumption: A Survey, Aug. 9, 2018 (Year: 2018).*

(Continued)

*Primary Examiner* — Dong U Kim
(74) *Attorney, Agent, or Firm* — Hanley, Flight & Zimmerman, LLC

(57) ABSTRACT

Methods, apparatus, systems, and articles of manufacture for allocating a workload to an accelerator using machine learning are disclosed. An example apparatus includes a workload attribute determiner to identify a first attribute of a first workload and a second attribute of a second workload. An accelerator selection processor causes at least a portion of the first workload to be executed by at least two accelerators, accesses respective performance metrics corresponding to execution of the first workload by the at least two accelerators, and selects a first accelerator of the at least two accelerators based on the performance metrics. A neural network trainer trains a machine learning model based on an association between the first accelerator and the first attribute of the first workload. A neural network processor processes, using the machine learning model, the second (Continued)

attribute to select one of the at least two accelerators to execute the second workload.

26 Claims, 6 Drawing Sheets

(51) Int. Cl.
*G06N 3/04* (2023.01)
*G06F 11/30* (2006.01)
*G06K 9/62* (2022.01)

(52) U.S. Cl.
CPC ......... *G06K 9/6256* (2013.01); *G06N 3/0445* (2013.01); *G06N 3/08* (2013.01)

(56) References Cited

U.S. PATENT DOCUMENTS

| | | | |
|---|---|---|---|
| 2011/0161972 A1* | 6/2011 | Dillenberger | G06F 9/5083 718/104 |
| 2013/0298130 A1 | 11/2013 | Pienaar et al. | |
| 2017/0195173 A1 | 7/2017 | Izenberg et al. | |
| 2017/0264680 A1* | 9/2017 | Palermo | G06F 30/331 |
| 2018/0107506 A1 | 8/2018 | Suzuki et al. | |
| 2018/0308206 A1 | 10/2018 | Surti et al. | |
| 2018/0357090 A1 | 12/2018 | Butcher et al. | |
| 2019/0050265 A1 | 2/2019 | Vijayaraghavan et al. | |
| 2019/0325302 A1 | 10/2019 | Savic et al. | |
| 2019/0377606 A1* | 12/2019 | Feng | G06F 9/5044 |
| 2020/0042362 A1 | 2/2020 | Cui et al. | |
| 2020/0042419 A1 | 2/2020 | Wei et al. | |
| 2020/0065283 A1 | 2/2020 | Jayaraman et al. | |

OTHER PUBLICATIONS

United States Patent and Trademark Office, "Notice of Allowance," issued in connection with U.S. Appl. No. 16/146,845, dated Feb. 10, 2021, 5 pages.

United States Patent and Trademark Office, "Final Office Action," issued in connection with U.S. Appl. No. 16/146,845, dated Oct. 26, 2020, 21 pages.

United States Patent and Trademark Office, "Non-Final Office Action," issued in connection with U.S. Appl. No. 16/146,845, dated May 22, 2020, 18 pages.

* cited by examiner

METHODS AND APPARATUS FOR ALLOCATING A WORKLOAD TO AN ACCELERATOR USING MACHINE LEARNING

RELATED APPLICATION

This patent arises from a continuation of U.S. patent application Ser. No. 16/146,845, (Now U.S. patent Ser. No. 11/030,012) which was filed on Sep. 28, 2018. U.S. patent application Ser. No. 16/146,845 is hereby incorporated herein by reference in its entirety. Priority to U.S. patent application Ser. No. 16/146,845 is hereby claimed.

FIELD OF THE DISCLOSURE

This disclosure relates generally to machine learning, and, more particularly, to methods and apparatus for allocating a workload to an accelerator using machine learning.

BACKGROUND

Machine learning models, such as neural networks, are useful tools that have demonstrated their value solving complex problems regarding pattern recognition, natural language processing, automatic speech recognition, etc. Neural networks operate using artificial neurons arranged into layers that process data from an input layer to an output layer, applying weighting values to the data during the processing of the data. Such weighting values are determined during a training process. Training a machine learning model on a large dataset is a challenging and expensive task that can take anywhere from hours to weeks to complete.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Machine learning workloads (e.g., training a machine learning model on a large dataset) are challenging and computationally expensive tasks that can take anywhere from hours to weeks to complete. Certain machine learning workloads are better suited for particular types of hardware. Such hardware is referred to as a machine learning accelerator and may include, for example, a central processing unit (CPU), a field programmable gate array (FPGA), a graphics processing unit (GPU), a logic circuit etc., and/or combinations thereof. A workload may utilize more computation time when executed on a first machine learning accelerator than when executed on a second machine learning accelerator due to hardware differences between the accelerators. Example approaches disclosed herein accelerate workload execution times by utilizing artificial intelligence (AI) to dynamically determine the type(s) of machine learning accelerator(s) to be used for execution of a workload based on a attribute(s) of the workload.

Example approaches disclosed herein improve workload execution time by utilizing AI to dynamically determine the type(s) of machine learning accelerator(s) to be used for a particular workload based on attribute(s) of the workload and/or the input data involved with the workload. For example, CPUs are best suited to accelerating memory-intensive data (entire images) while FPGAs may be used to effectively accelerate workloads for which processing can be parallelized (e.g., image processing/edge detection algorithms, which can operate on a single pixel in an image). Some workloads are best accelerated by platforms that combine the inherent advantages of FPGAs/CPUs in an integrated package or board, enabling low latency lookaside or inline acceleration to be implemented (e.g., image processing algorithms requiring low latency memory accesses between CPU and FPGA).

Figure 1:
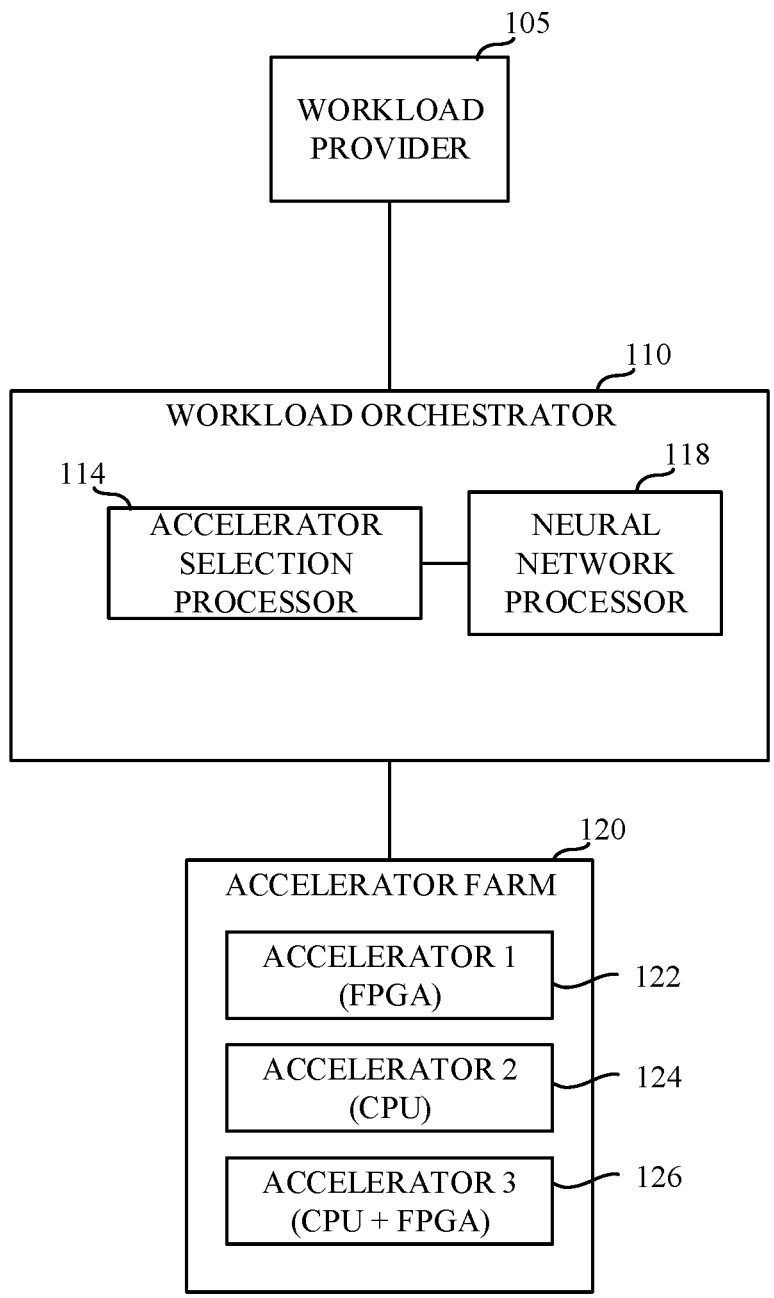
FIG. 1 is a block diagram of an example computing system constructed in accordance with teachings of this disclosure and including a workload orchestrator and an accelerator farm deep learning accelerator for training a neural network.

FIG. 1 is a block diagram of an example computing system including workload provider 105, a workload orchestrator 110, and an accelerator farm 120. In the illustrated example of FIG. 1, the workload provider 105 provides a workload to the workload orchestrator 110. The example workload orchestrator includes an accelerator selection processor 114 that utilizes a neural network processor 118 to select, based on attribute(s) of the workload, an accelerator of the accelerator farm 120 to be selected for execution of the workload. As a result, the workload orchestrator 110 orchestrates the execution of the workload at one or more of the accelerators 122, 124, 126 in the example accelerator farm 120.

The example workload provider 105 of the illustrated example of FIG. 1 provides a workload to the example workload orchestrator 110 for execution. In examples disclosed herein, the workload is a machine learning workload and execution of the workload results in the training and/or use of a machine learning model. However, any other type of computing workload may additionally or alternatively be used. In examples disclosed herein, the workload provider 105 provides the workload using electronic communications such as, for example, a computer network (e.g., the Internet). However, any other approach to providing the example workload to the workload orchestrator 110 may additionally or alternatively be used.

The example workload orchestrator 110 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example workload orchestrator 110 of the illustrated example of FIG. 1 receives a workload from the workload provider 105 and, using machine learning, selects one or more accelerator(s) of the accelerator farm 120 on which the workload is to be executed. An example approach to implementing the example workload orchestrator 110 is described in further detail in connection with FIG. 2.

The example accelerator selection processor 114 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example accelerator selection processor 114 evaluates attribute(s) of a workload to select an appropriate accelerator to be used to execute the workload. In some examples, the accelerator selection processor 114 evaluates whether the workload can be parallelized and/or whether the workload is resource intensive to determine an appropriate accelerator. At this point, the accelerator selection processor 114 does not necessarily send the workload to the selected accelerator, but instead stores the attributes of the workload in connection with the selected accelerator such that the associations of workload attributes and selected accelerator may be used as training data for a neural network implemented by the neural network processor 118. Upon receipt of a subsequent workload, the example accelerator selection processor 114 uses the attributes of the subsequent workload as an input to the neural network (e.g., the neural network implemented by the neural network processor 118) to identify which accelerator should be used for execution of the workload.

In some other examples, during creation of the training data associating workload attributes with selected accelerator(s), the accelerator selection processor 114 causes the workload (and/or a portion thereof) to be executed at each of the potential accelerators, and selects an appropriate accelerator based on performance metric(s) associated with the execution of the workload. The selected accelerator and the attributes of the workload are used as training data for a neural network implemented by the example neural network processor 118. Again, upon receipt of a subsequent workload, the example accelerator selection processor 114 uses the attributes of the subsequent workload as an input to the neural network (e.g., the neural network implemented by the neural network processor 118) to identify which accelerator should be used for execution of the workload.

The example neural network processor 118 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example neural network processor 118 implements a machine learning model (e.g., a neural network) according to the model information created through a training process. In examples disclosed herein, the machine learning model of is a deep neural network (DNN). However, any other past, present, and/or future machine learning topology(ies) and/or architecture(s) may additionally or alternatively be used such as, for example, a convolutional neural network (CNN), a feed-forward neural network.

The example accelerator farm 120 of the illustrated example of FIG. 1 includes two or more machine learning accelerators 122, 124, 126 used to execute a workload. In the illustrated example of FIG. 1, the example accelerator farm 120 includes three accelerators 122, 124, 126. However, any number of accelerators may additionally or alternatively be used. The different accelerators represent different types of physical hardware used to execute a workload. In the illustrated example of FIG. 1, the first accelerator 122 represents an FPGA-based accelerator. For example, an FPGA-based accelerator may be used to accelerate a workload for which processing can be parallelized (e.g., image processing/edge detection algorithms that can operate on a single pixel in an image). In the illustrated example of FIG. 1, the second accelerator 124 represents a CPU. CPU-based accelerators are better suited to performing resource-intensive workloads, as compared to an FPGA-based accelerator. The third example accelerator 126 of this example represents a combined CPU and FPGA based accelerator. In some examples, CPU-based accelerators and FPGA-based accelerators may be used in combination, thereby enabling low latency lookaside and/or inline acceleration to be implemented, which benefit image processing algorithms requiring low latency memory accesses between a CPU and an FPGA. Moreover, any other past, present, and/or future type of accelerator may additionally or alternatively be used such as, for example, a graphics processing unit (GPU-based architecture), a digital signal processor (DSP-based architecture), etc.

Figure 2:
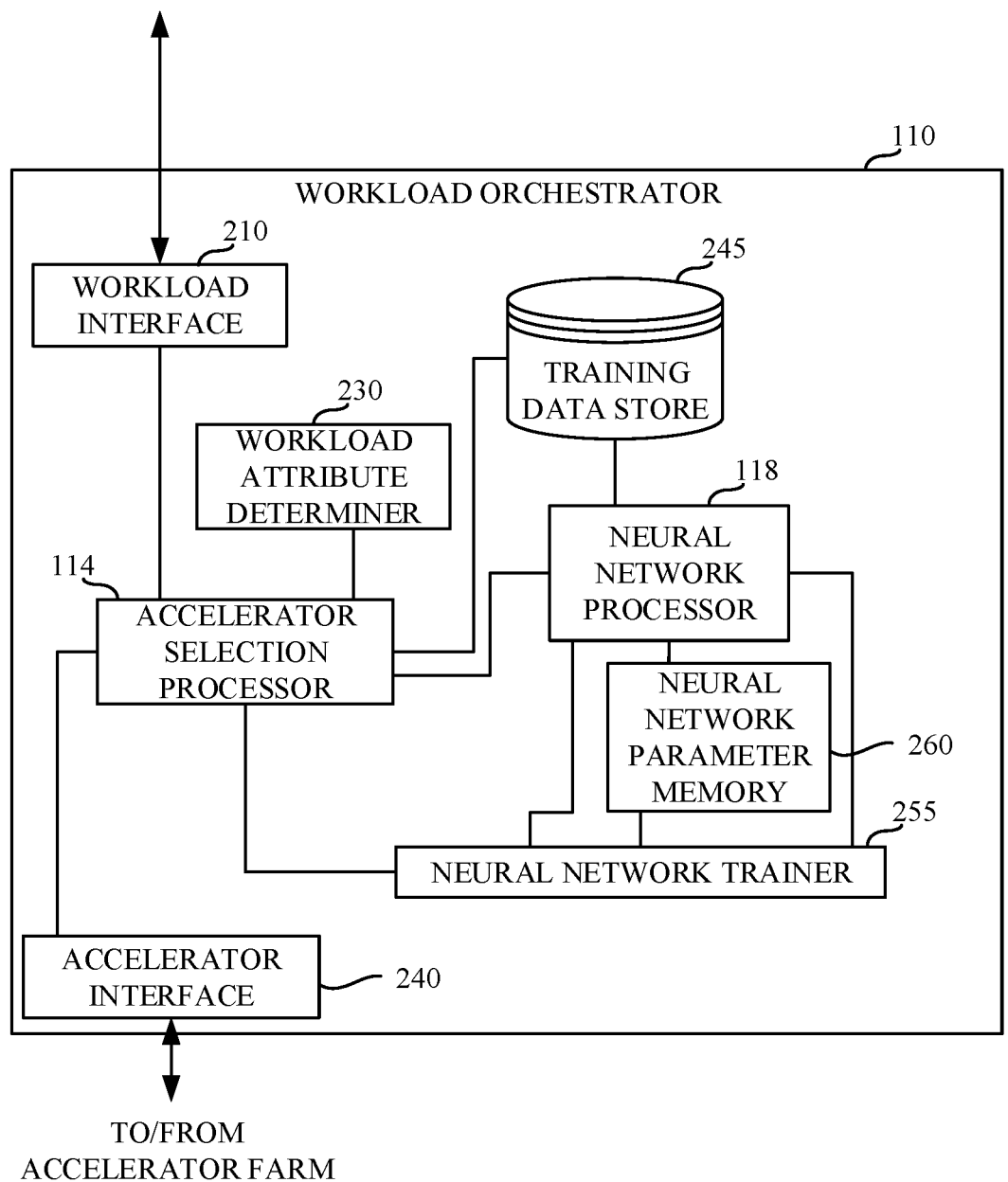
FIG. 2 is a block diagram representing an example implementation of the workload orchestrator of FIG. 1.

FIG. 2 is a block diagram representing an example implementation of the workload orchestrator 110 of FIG. 1. The workload orchestrator 110 of the example of FIG. 2 includes a workload interface 210, the accelerator selection processor 114, a workload attribute determiner 230, an accelerator interface 240, a training data store 245, the neural network processor 118, a neural network trainer 255, and a neural network parameter memory 260.

The example workload interface 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example workload interface 210 of the illustrated example of FIG. 2 implements a web interface to receive a workload from the workload provider 105. However, any other type of interface may additionally or alternatively be used. In some examples, the workload interface 210 enables the workload provider 105 to identify attribute(s) of the workload to the workload orchestrator 110. The example workload interface 210 passes the workload to the accelerator selection processor 114 for processing, and upon completion of the processing, returns a result of the execution of the workload to the workload provider 105.

As noted above in connection with FIG. 1, the example accelerator selection processor 114 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example accelerator selection processor 114 evaluates attribute(s) of workloads to select an appropriate accelerator to be used to execute the workload. In some examples, the accelerator selection processor 114 evaluates whether the workload can be parallelized and/or whether the workload is resource intensive to determine an appropriate accelerator. In some other examples, the accelerator selection processor 114 causes the workload (and/or a portion thereof) to be executed at each of the potential accelerators, and selects an appropriate accelerator based on performance metric(s) associated with the execution of the workload. The selection of the appropriate accelerator and the attributes of the workload are used as training data for a neural network implemented by the example neural network processor 118. Upon receipt of a subsequent workload, the example accelerator selection processor 114 uses the attributes of the subsequent workload as an input to the neural network implemented by the neural network processor 118 to identify which accelerator should be used for execution of the workload.

The example workload attribute determiner 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example workload attribute determiner 230 identifies attributes and/or other properties of the workloads received at the workload orchestrator 110. The attribute(s) may include, for example, whether the workload can be parallelized, whether the workload is resource intensive, whether the workload deals with image processing, whether the workload deals with text processing, and/or any other information about the execution of the workload and/or data to be processed in connection with the workload, etc.

The example accelerator interface 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example accelerator interface 240 of the illustrated example of FIG. 2 enables the workload orchestrator 110 to communicate with the accelerator farm 120. As a result, the accelerator interface 240 provides workloads (and/or portions thereof) to the accelerator farm 120 with a selection of which accelerator 122, 124, 126 should execute the workload. In some examples, multiple different accelerator farms may be used. Thus, the example accelerator interface 240 may, in some examples, enable communication with multiple (e.g., two or more) different accelerator farms.

The training data store 245 of the example of FIG. 2 is implemented by any memory, storage device and/or storage disc for storing data such as, for example, flash memory, magnetic media, optical media, etc. Furthermore, the data stored in the example training data store 245 may be in any data format such as, for example, binary data, comma delimited data, tab delimited data, structured query language (SQL) structures, etc. While in the illustrated example the example training data store 245 is illustrated as a single device, the example training data store 245 and/or any other data storage devices described herein may be implemented by any number and/or type(s) of memories. In the illustrated example of FIG. 2, the example training data store 245 stores information used to train the neural network parameters.

Those neural network parameters may then be stored in the example neural network parameter memory 260. Such information may include, for example, attribute(s) of workload(s) and their corresponding selected accelerator.

The example neural network processor 118 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example neural network processor 118 implements a machine learning model (e.g., a neural network) according to the model information stored in the neural network parameter memory 260. The example machine learning model of the illustrated example of FIG. 2 is a deep neural network (DNN). However, any other past, present, and/or future machine learning topology(ies) and/or architecture(s) may additionally or alternatively be used such as, for example, a convolutional neural network (CNN), a feed-forward neural network.

The example neural network trainer 255 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example neural network trainer 255 performs training of the model stored in the neural network parameter memory 260. In examples disclosed herein, training is performed using Stochastic Gradient Descent. However, any other approach to training a machine learning model may additionally or alternatively be used.

The example neural network parameter memory 260 of the illustrated example of FIG. 2 is implemented by any memory, storage device and/or storage disc for storing data such as, for example, flash memory, magnetic media, optical media, etc. Furthermore, the data stored in the example neural network parameter memory 260 may be in any data format such as, for example, binary data, comma delimited data, tab delimited data, structured query language (SQL) structures, etc. While in the illustrated example the neural network parameter memory 260 is illustrated as a single device, the neural network parameter memory 260 and/or any other data storage devices described herein may be implemented by any number and/or type(s) of memories. In the illustrated example of FIG. 2, the example neural network parameter memory 260 stores neural network weighting parameters that are used by the neural network processor 118 to select an accelerator based on workload attributes.

While an example manner of implementing the workload orchestrator 110 of FIG. 1 is illustrated in FIG. 2, one or more of the elements, processes and/or devices illustrated in FIG. 2 may be combined, divided, re-arranged, omitted, eliminated and/or implemented in any other way. Further, the example workload interface 210, the example accelerator selection processor 114, the example workload attribute determiner 230, the example accelerator interface 240, the example training data store 245, the example neural network processor 118, the example neural network trainer 255, the example neural network parameter memory 260, and/or, more generally, the example workload orchestrator 110 of FIGS. 1 and/or 2 may be implemented by hardware, software, firmware and/or any combination of hardware, software and/or firmware. Thus, for example, any of the example workload interface 210, the example accelerator selection processor 114, the example workload attribute determiner 230, the example accelerator interface 240, the example training data store 245, the example neural network processor 118, the example neural network trainer 255, the example neural network parameter memory 260, and/or, more generally, the example workload orchestrator 110 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload interface 210, the example accelerator selection processor 114, the example workload attribute determiner 230, the example accelerator interface 240, the example training data store 245, the example neural network processor 118, the example neural network trainer 255, the example neural network parameter memory 260, and/or, more generally, the example workload orchestrator 110 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example workload orchestrator 110 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
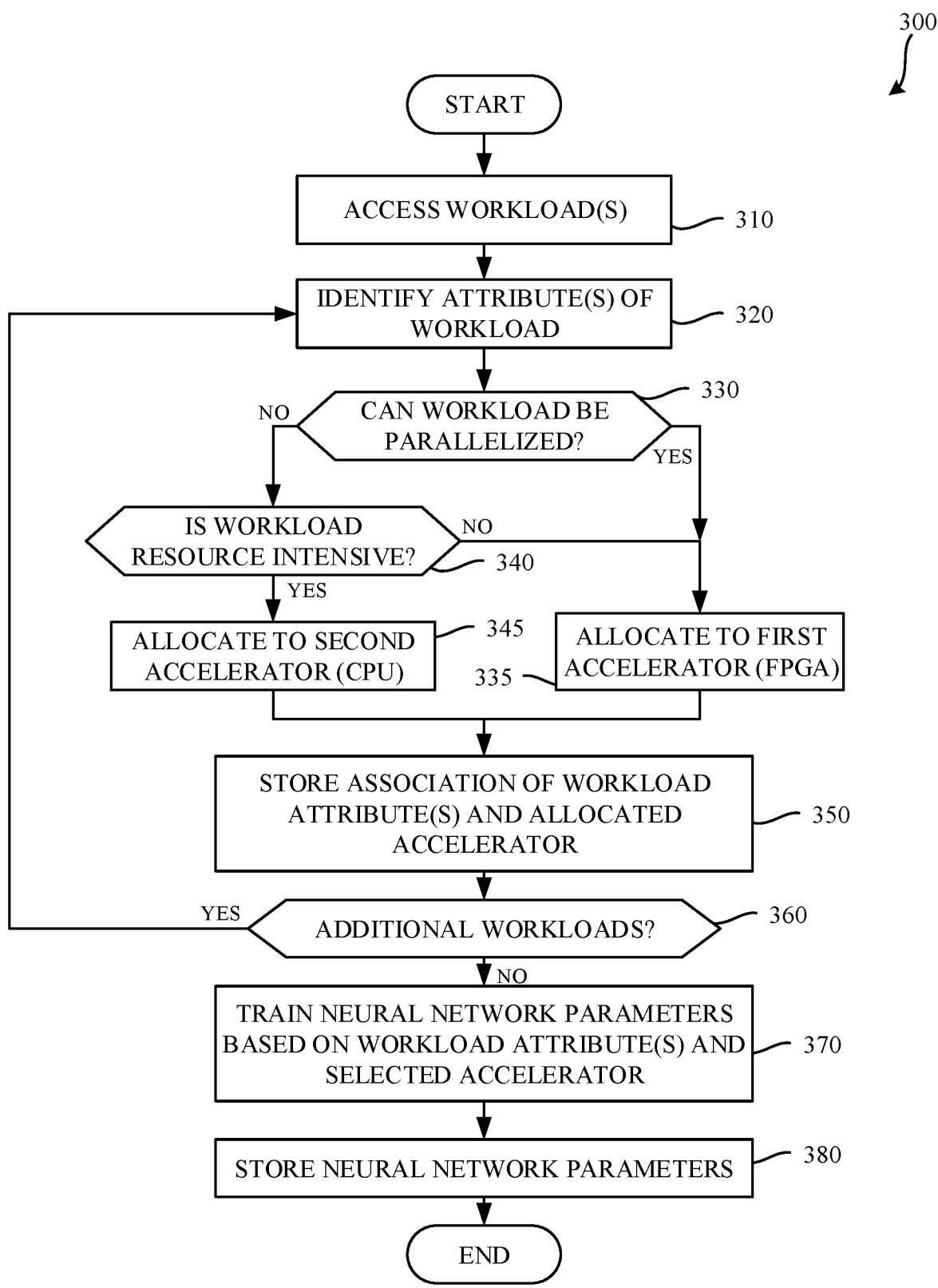
FIG. 3 is a flowchart representative of example machine readable instructions which may be executed to implement the example workload orchestrator of FIGS. 1 and/or 2 to train a neural network to select a workload accelerator for an input workload.
Figure 4:
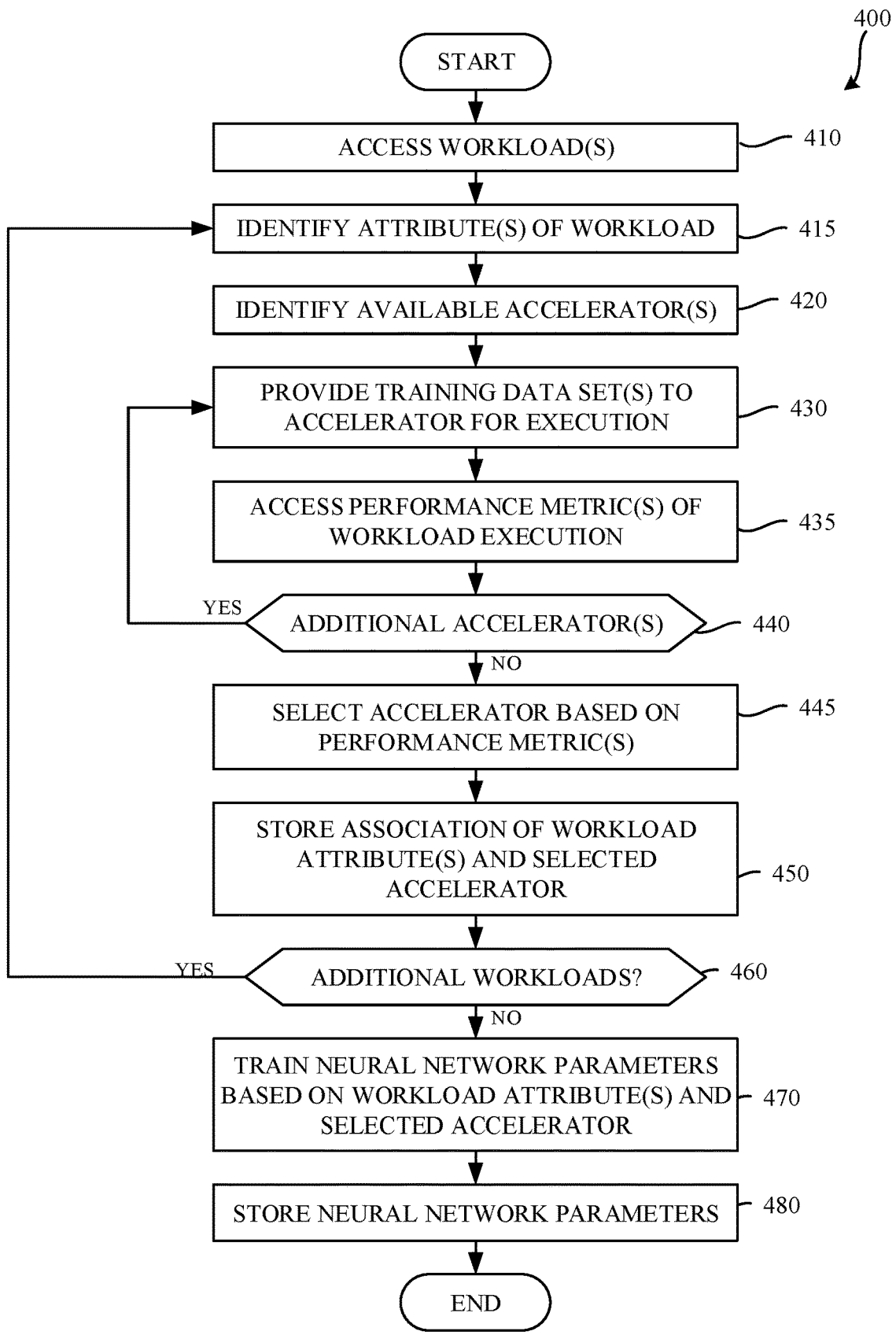
FIG. 4 is a flowchart representative of alternative example machine readable instructions which may be executed to implement the example workload orchestrator of FIGS. 1 and/or 2 to train a neural network to select a workload accelerator for an input workload.

Flowcharts representative of example hardware logic, machine readable instructions, hardware implemented state machines, and/or any combination thereof for implementing the example workload orchestrator 110 of FIGS. 1 and/or 2 are shown in FIGS. 3, 4, and/or 5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and/or 5, many other methods of implementing the example workload orchestrator 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3, 4, and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart representative of machine readable instructions which may be executed to implement the example workload orchestrator of FIGS. 1 and/or 2. As explained above, the example workload orchestrator includes and/or trains a neural network to select a workload accelerator for an input workload. The example process 300 of the illustrated example of FIG. 3 begins when the example workload interface 210 accesses a workload provided by the workload provider 105. (Block 310). In examples disclosed herein, the workload is received via a web interface (e.g., the Internet). However, the example workload may be received in any other fashion. In some examples, the workload interface 210 may receive multiple workloads.

The example workload attribute determiner 230 identifies attribute(s) of the workload. (Block 320). In examples disclosed herein, the example workload attribute determiner 230 inspects the workload to identify properties of the data and/or tasks that are to be performed in connection with the workload. However, in some examples, the attribute(s) may be identified and/or provided to the workload interface 210 by the workload provider 105. For example, a user may provide the attribute(s) to the workload orchestrator 110. The attribute(s) may include, for example, whether the workload can be parallelized, whether the workload is resource intensive, whether the workload deals with image processing, whether the workload deals with text processing, and/or any other information about the execution of the workload and/or data to be processed in connection with the workload, etc.

The example accelerator selection processor 114 determines whether the workload can be parallelized. (Block 330). If the workload can be parallelized (e.g., block 330 returns a result of YES), the example accelerator selection processor 114 allocates the workload to a first accelerator. (Block 335). In the illustrated example of FIG. 3 the first accelerator is an FPGA-based accelerator. However, any other type of accelerator may additionally or alternatively be used.

If the example accelerator selection processor 114 determines that the workload cannot be parallelized (e.g., 330 returns a result of NO), the example accelerator selection processor 114 determines whether the workload is resource intensive. (Block 340). In the illustrated example of FIG. 3, the workload is considered resource intensive when the workload would cause the accelerator to use at least a threshold amount of memory. However, any other type of computing resource (e.g., hard disk space, processor cycles, network bandwidth) may additionally or alternatively be considered. In some examples, workloads that are resource intensive are better handled by a CPU-based accelerator. If the example accelerator selection processor 114 determines that the workload is resource intensive (e.g., block 340 returns a result of YES), the example accelerator selection processor 114 allocates the workload to a second accelerator. (Block 345). In the illustrated example of FIG. 3, the second accelerator is a CPU-based accelerator. If the example accelerator selection processor 114 determines that the workload is not resource intensive (e.g., block 340 returns a result of NO), the accelerator selection processor 114 allocates the workload to the first accelerator. (Block 335).

The example accelerator selection processor 114 stores the association of the workload attribute(s) and the allocated accelerator in the training data store 245. (Block 350). The example accelerator selection processor 114 determines whether any other workloads are available for allocation to accelerator for training purposes. (Block 360). If additional workloads exist (e.g., block 360 returns a result of YES), the example process of blocks 320 through 360 are repeated until no additional workloads exist.

Upon determining that all workloads have been allocated (e.g., block 360 returns a result of NO), the example accelerator selection processor 114 directs the neural network trainer 255 to train neural network parameters stored in the example neural network parameter memory 260 based on the workload attribute(s) and selected accelerator(s). (Block 370). The example neural network trainer 255 stores the neural network parameters in the neural network parameter memory 260. (Block 380). The example neural network trainer 255 performs training of the neural network implemented by the neural network processor 118. In examples disclosed herein, training is performed using a stochastic gradient descent process. However, any other approach to training a neural network may additionally or alternatively be used.

As a result of the training, upon receipt of subsequent workloads, an accelerator can be selected by the neural network processor 118 using the neural network parameters stored in the neural network parameter memory 260 and attribute(s) of the subsequent workload. The example process 300 of the illustrated example of FIG. 3 then terminates, but may be repeated to perform additional training of the neural network parameters stored in the example neural network parameter memory 260.

FIG. 4 is a flowchart representative of example machine readable instructions which may be executed to implement the example workload orchestrator of FIGS. 1 and/or 2 to train a neural network to select a workload accelerator for an input workload. The example process 400 of the illustrated example of FIG. 4 begins when the example workload interface 210 accesses a workload provided by the workload provider 105. (Block 410). In examples disclosed herein, the workload is received via a web interface (e.g., the Internet). However, the example workload may be received in any other fashion. In some examples, the workload interface 210 may receive multiple workloads.

The example workload attribute determiner 230 identifies attribute(s) of the accessed workload. (Block 415). In examples disclosed herein, the example workload attribute determiner 230 inspects the workload to identify properties of the data and/or tasks that are to be performed by the workload. However, in some examples, the attribute(s) may be identified and/or provided to the workload interface 210 by the workload provider 105. For example, a user may provide the attribute(s) to the workload orchestrator 110. The attribute(s) may include, for example, whether the workload can be parallelized, whether the workload is resource intensive, whether the workload deals with image processing, whether the workload deals with text processing, and/or any other information about the execution of the workload and/or data to be processed in connection with the workload, etc.

The example accelerator selection processor 114 determines, via the example accelerator interface 240, identities of available accelerators. (Block 420). The example accelerator selection processor 114 provides a workload (e.g., the received workload) to an identified accelerator for execution via the accelerator interface 240. (Block 430). In some examples, a portion of the workload is provided to the accelerator. Providing a portion of the workload ensures that, for workloads that would otherwise take long amounts of time to complete, the workload can be completed in a shorter amount of time. As a result, the amount of time required to determine which accelerator should be selected is reduced.

The example accelerator selection processor 114 accesses performance metrics of the workload execution via the accelerator interface 240. (Block 435). In examples disclosed herein, the performance metric is an amount of time that the workload took for execution. However, any other performance metric may additionally or alternatively be used such as, for example, an amount of resources used to complete the workload, and efficiency of the accelerator, etc. In some examples, multiple different performance metrics may be combined together to create a composite performance metric. The example accelerator selection processor 114 determines whether there are any other accelerators that may be used to execute the workload. (Block 440). If an additional accelerator exists (e.g., block 440 returns a result of YES), the example process of blocks 430 through 440 is repeated to create performance metrics for the workload in combination with each of the accelerators.

If the example accelerator selection processor 114 determines that no additional accelerators exist (e.g., block 440 returns a result of NO), the example accelerator selection processor 114 selects an accelerator based on the collected performance metrics. (Block 445). For example, the accelerator selection processor 114 may select an accelerator that resulted in the shortest execution time. The example accelerator selection processor 114 stores an association of the workload attribute(s) and the corresponding selected accelerator in the training data store 245. (Block 450).

The example accelerator selection processor 114 determines whether any additional workloads exist. (Block 460). If additional workloads exist (e.g., block 460 returns a result of YES), the example process of blocks 415 through 460 are repeated until no additional workloads exist.

Upon determining that all workloads have had their respective attribute(s) and performance metrics determined, (e.g., block 460 returns a result of NO), the example accelerator selection processor 114 directs the neural network trainer 255 to train neural network parameters stored in the example neural network parameter memory 260 based on the workload attribute(s) and selected accelerator(s). (Block 470). The example neural network trainer 255 performs the training of the neural network implemented by the neural network processor 118. In examples disclosed herein, training is performed using a stochastic gradient descent process. However, any other approach to training a neural network may additionally or alternatively be used.

The example neural network trainer 255 stores the neural network parameters in the neural network parameter memory 260. (Block 480). As a result, upon receipt of subsequent workloads, the attribute(s) of the workload can be determined, and an appropriate accelerator can be selected by the neural network processor 118 using the neural network parameters stored in the neural network parameter memory 260. The example process 400 of the illustrated example of FIG. 4 then terminates, but may be repeated to perform additional training of the neural network parameters stored in the example neural network parameter memory 260.

Figure 5:
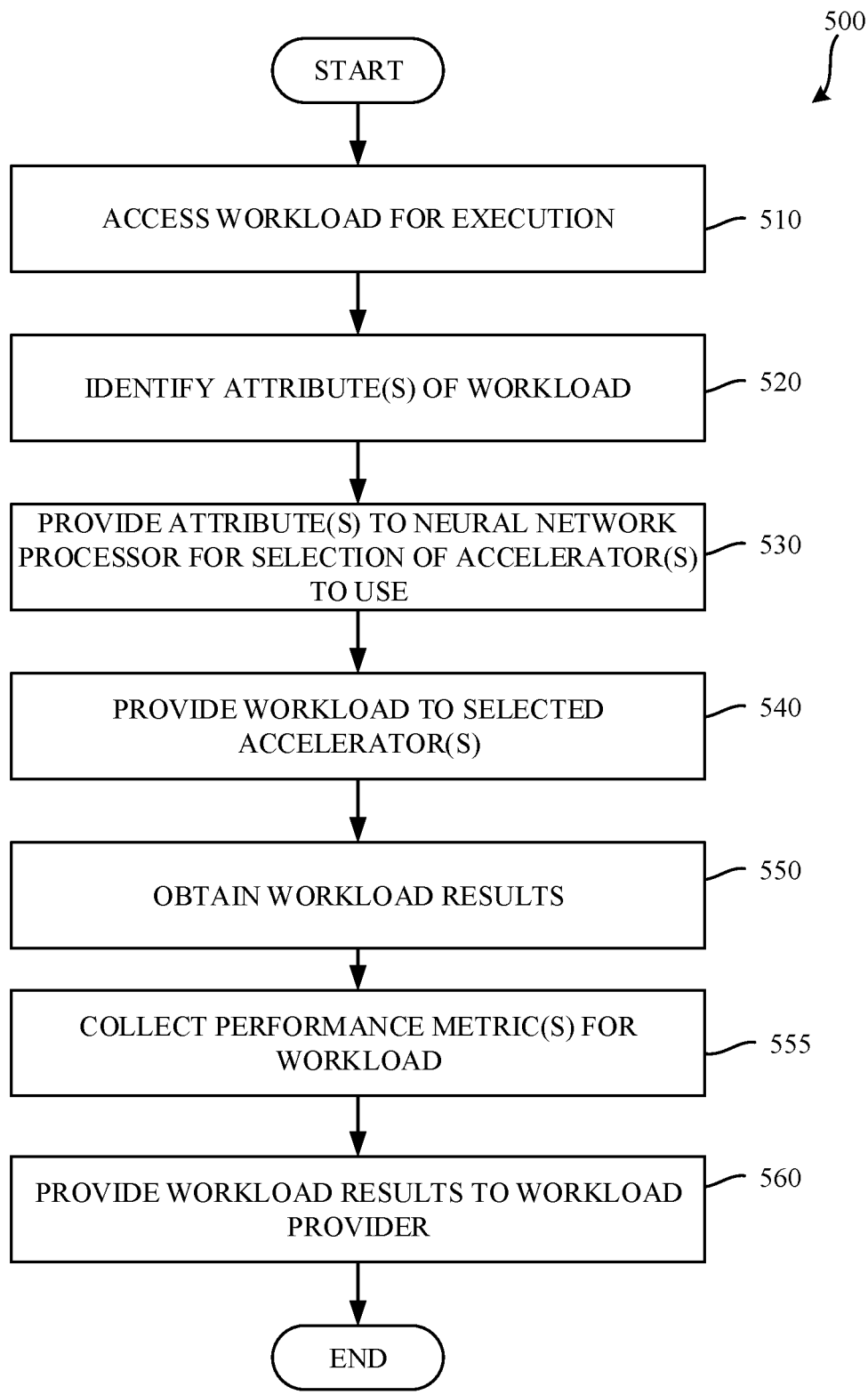
FIG. 5 is a flowchart representative of example machine readable instructions which may be executed to implement the example workload orchestrator of FIGS. 1 and/or 2 to use the neural network trained in connection with FIGS. 3 and/or 4 to select a workload accelerator for an input workload.

FIG. 5 is a flowchart representative of example machine readable instructions which may be executed to implement the example workload orchestrator 110 of FIGS. 1 and/or 2 to use the neural network trained in connection with FIGS. 3 and/or 4 to select a workload accelerator for an input workload. The example process 500 of the illustrated example of FIG. 5 begins when the example workload interface 210 accesses a workload provided by the workload provider 105. (Block 510). In examples disclosed herein, the workload is received via a web interface (e.g., the Internet). However, the example workload may be received in any other fashion.

The example workload attribute determiner 230 identifies attribute(s) of the workload. (Block 520). In examples disclosed herein, the example workload attribute determiner 230 inspects the workload to identify properties of the data and/or tasks that are to be performed by the workload. However, in some examples, the attribute(s) may be identified and/or provided to the workload interface 210 by the workload provider 105. For example, a user may provide the attribute(s) to the workload orchestrator 110. The attribute(s) may include, for example, whether the workload can be parallelized, whether the workload is resource intensive, whether the workload deals with image processing, whether the workload deals with text processing, etc.

The example accelerator selection processor 114 provides the attribute(s) of the workload to the neural network processor 118 for selection of an accelerator to be used to execute the workload. The example neural network processor 118 uses the neural network parameters stored in the example neural network parameter memory 260 to generate an indication of one or more accelerators to be used to execute the workload. (Block 530). The accelerator selection processor 114 then provides the workload to the selected accelerator(s) via the example accelerator interface 240. (Block 540). In some examples, multiple different accelerators may be used. In such an example, the workload may be segmented and/or divided into portions for execution among the different accelerator(s). The accelerator(s) may then execute the workload and/or portions thereof in a parallel fashion and/or in a serial fashion. The example accelerator selection processor 114 obtains the results of the workload execution via the example accelerator interface 240. (Block 550). The example accelerator selection processor 114 collects performance metrics resulting from the execution of the workload, and stores those performance metrics (and the attribute(s) of the workload) as training data in the example training data store 245. (Block 555). Thus, future training instances may benefit from the execution of the workload without having to re-execute the workload and collect the corresponding performance metrics for that workload. The example workload interface 210 then provides the results of the workload execution to the workload provider 105. (Block 560). The example process 500 of the illustrated example of FIG. 5 then terminates, but may be repeated upon receipt of a subsequent workload for execution.

Figure 6:
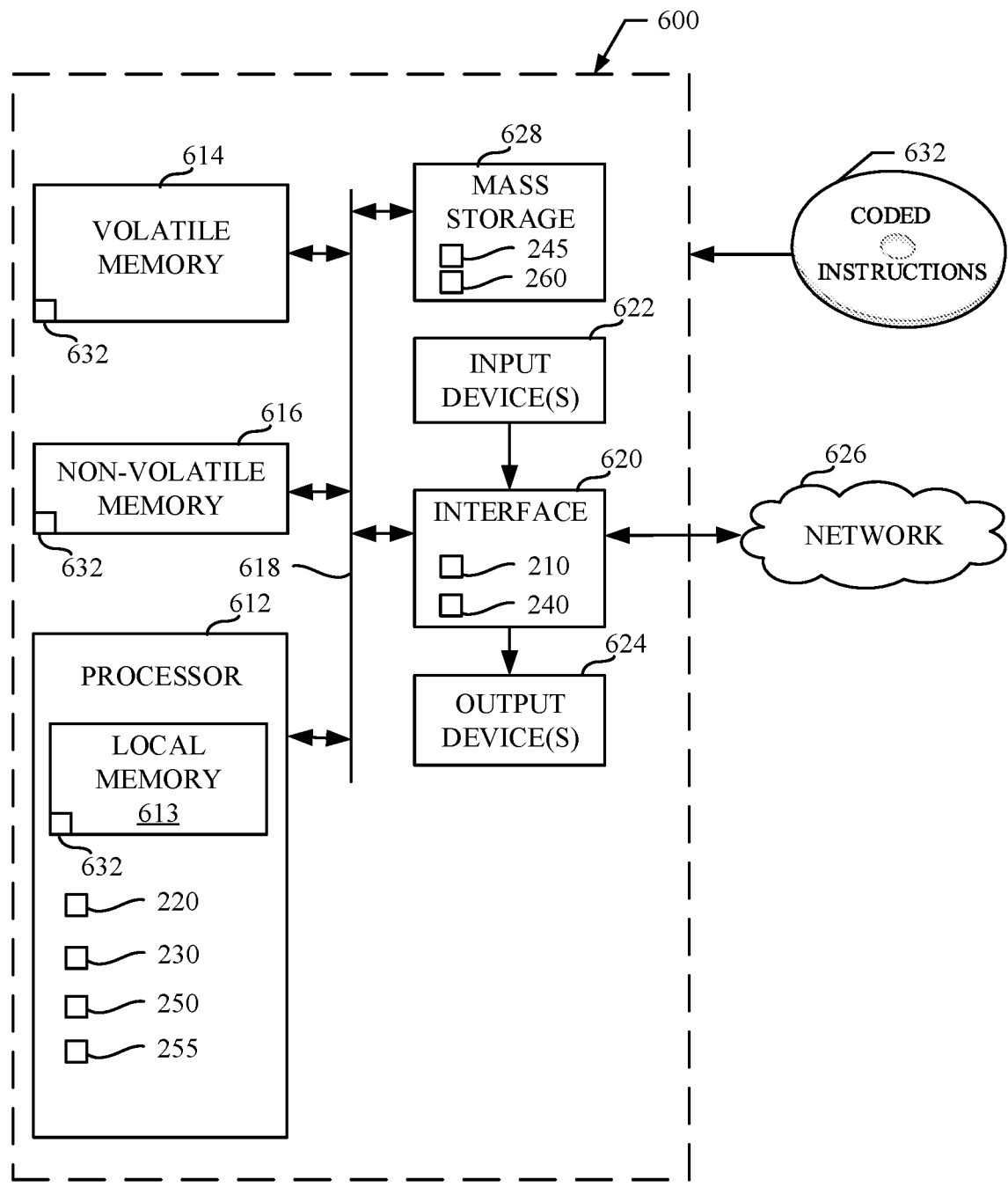
FIG. 6 is a block diagram of an example processing platform structured to execute the instructions of FIGS. 3, 4, and/or 5 to implement the example workload orchestrator of FIGS. 1 and/or 2.

FIG. 6 is a block diagram of an example processor platform 600 structured to execute the instructions of FIGS. 3, 4, and/or 5 to implement the example workload orchestrator 110 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example accelerator selection processor 114, workload attribute determiner 230, neural network processor 118, and neural network trainer 255.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface. In the illustrated example of FIG. 6, the interface circuit 620 implements the example workload interface 210 and the example accelerator interface 240.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3, 4, and/or 5 may be stored in the mass storage device 628, in the volatile memory 614, in the non-volatile memory 616, and/or on a removable non-transitory computer readable storage medium such as a CD or DVD. In the illustrated example of FIG. 6, the mass storage device 628 implements the example training data store 245 and the example neural network parameter memory 260.

From the foregoing, it will be appreciated that example methods, apparatus and articles of manufacture have been disclosed that enable allocation of a workload to an accelerator using machine learning. Disclosed methods, apparatus and articles of manufacture improve the efficiency of using a computing device by dynamically assigning compute resources which are best suited to a workload. Using machine learning to dynamically match a workload to one or more machine learning accelerator(s) ensures that the execution of the workload is customized to a location (e.g., hardware type) that is best suited for execution of that workload. Disclosed methods, apparatus and articles of manufacture are accordingly directed to one or more improvement(s) in the functioning of a computer.

Example 1 includes an apparatus for executing a workload, the apparatus comprising a workload attribute determiner to identify a first attribute of a first workload, the workload attribute determiner to identify a second attribute of a second workload, an accelerator selection processor to cause at least a portion of the first workload to be executed by at least two accelerators, the accelerator selection processor to access respective performance metrics corresponding to execution of the first workload by the at least two accelerators, the accelerator selection processor to select a first accelerator of the at least two accelerators based on the performance metrics, a neural network trainer to train a machine learning model based on an association between the first accelerator and the first attribute of the first workload, and a neural network processor to process, using the machine learning model, the second attribute to select one of the at least two accelerators to execute the second workload.

Example 2 includes the apparatus of example 1, further including an accelerator interface to provide the second workload to the selected one of the at least two accelerators for execution.

Example 3 includes the apparatus of example 2, further including a workload interface to provide a result of the execution of the second workload to a workload provider.

Example 4 includes the apparatus of example 2, wherein the accelerator selection processor is to access a performance metric associated with execution of the second workload at the selected one of the at least two accelerators, and subsequent training of the machine learning model is further based on the performance metric and the second attribute of the second workload.

Example 5 includes the apparatus of example 1, wherein the respective performance metrics represent execution times of the first workload at the corresponding one of the at least two accelerators.

Example 6 includes the apparatus of any one of examples 1 through 5, wherein the first attribute represents whether the first workload is parallelizable.

Example 7 includes the apparatus any one of examples 1 through 5, wherein the first attribute represents whether the first workload is resource intensive.

Example 8 includes the apparatus of example 1, wherein a first accelerator of the two or more accelerators is a central processing unit based accelerator and a second accelerator of the two or more accelerators is a field programmable gate array based accelerator.

Example 9 includes at least one non-transitory machine-readable medium comprising instructions that, when executed, cause at least one processor to at least identify a first attribute of a first workload, cause at least a portion of the first workload to be executed by at least two accelerators, access respective performance metrics corresponding to execution of the first workload by the at least two accelerators, select a first accelerator of the at least two accelerators based on the performance metrics, train a machine learning model based on an association between the first accelerator and the first attribute of the first workload, identify a second attribute of a second workload, and process, using the machine learning model, the second attribute to select one of the at least two accelerators to execute the second workload.

Example 10 includes the at least one non-transitory machine-readable medium of example 9, wherein the instructions, when executed, further cause the at least one processor to provide the second workload to the selected one of the at least two accelerators for execution.

Example 11 includes the at least one non-transitory machine-readable medium of example 10, wherein the instructions, when executed, further cause the at least one processor to provide a result of the execution of the second workload to a workload provider.

Example 12 includes the at least one non-transitory machine-readable medium of example 10, wherein the instructions, when executed, further cause the at least one processor to access a performance metric associated with execution of the second workload at the selected one of the at least two accelerators, and re-train the machine learning model based on the performance metric and the second attribute of the second workload.

Example 13 includes the at least one non-transitory machine-readable medium of example 9, wherein the respective performance metrics represent execution times of the first workload at the corresponding one of the at least two accelerators.

Example 14 includes the at least one non-transitory machine-readable medium of any one of examples 9 through 13, wherein the first attribute represents whether the first workload is parallelizable.

Example 15 includes the at least one non-transitory machine-readable medium of any one of examples 9 through 13, wherein the first attribute represents whether the first workload is resource intensive.

Example 16 includes an apparatus for allocation of workloads to an accelerator, the apparatus comprising means for determining attributes of workloads, means for causing a first workload to be executed by at least two accelerators, the means for causing to access respective performance metrics corresponding to execution of the first workload by the at least two accelerators, the means for causing to select a first accelerator of the at least two accelerators based on the performance metrics, means for training a machine learning model based on an association between the first accelerator and the first attribute of the first workload, and means for processing, using the machine learning model, a second attribute of a second workload to select one of the at least two accelerators to execute the second workload.

Example 17 includes the apparatus of example 16, further including means for providing the second workload to the selected one of the at least two accelerators for execution.

Example 18 includes the apparatus of example 17, further including means for interfacing to provide a result of the execution of the second workload to a workload provider.

Example 19 includes the apparatus of example 17, wherein the means for causing is to access a performance metric associated with execution of the second workload at the selected one of the at least two accelerators, subsequent training of the machine learning model to be based on the performance metric and the second attribute of the second workload.

Example 20 includes the apparatus of example 16, wherein the respective performance metrics represent execution times of the first workload at the corresponding at least two accelerators.

Example 21 includes the apparatus of any one of examples 16 through 20, wherein the first attribute represents whether the first workload is parallelizable.

Example 22 includes the apparatus of any one of examples 16 through 20, wherein the first attribute represents whether the first workload is resource intensive.

Example 23 includes the apparatus of example 16, wherein a first accelerator of the two or more accelerators is a central processing unit based accelerator and a second accelerator of the two or more accelerators is a field programmable gate array based accelerator.

Example 24 includes a method of allocating workloads to an accelerator, the method comprising identifying a first attribute of a first workload, causing the first workload to be executed by at least two accelerators, accessing respective performance metrics corresponding to execution of the first workload by the at least two accelerators, selecting a first accelerator of the at least two accelerators based on the performance metrics, training a machine learning model based on an association between the first accelerator and the first attribute of the first workload, identifying a second attribute of a second workload, and processing, using the machine learning model, the second attribute to select one of the at least two accelerators to execute the second workload.

Example 25 includes the method of example 24, further including providing the second workload to the selected one of the at least two accelerators for execution.

Example 26 includes the method of example 25, further including providing a result of the execution of the second workload to a workload provider.

Example 27 includes the method of example 25, further including accessing a performance metric associated with execution of the second workload at the selected one of the at least two accelerators, and subsequently training the machine learning model based on the performance metric and the second attribute of the second workload.

Example 28 includes the method of example 24, wherein the respective performance metrics represent execution times of the first workload at the corresponding at least two accelerators.

Example 29 includes the method of any one of examples 24 through 28, wherein the first attribute represents whether the first workload is parallelizable.

Example 30 includes the method of any one of examples 24 through 28, wherein the first attribute represents whether the first workload is resource intensive.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for executing a workload, the apparatus comprising:
    a workload attribute determiner to identify a first attribute of a first workload, the first attribute representing whether the first workload would cause a second accelerator to access memory in an amount of time less than a threshold latency, the workload attribute determiner to identify a second attribute of a second workload;
    an accelerator selection processor to:
        in response to the first attribute representing that the first workload would cause the second accelerator to access memory in an amount of time less than the threshold latency, cause at least a portion of the first workload to be executed by both a first accelerator and the second accelerator;
        in response to the first attribute representing that the first workload would cause the first accelerator to access memory in an amount of time greater than the threshold latency, cause at least a portion of the first workload to be executed by the first accelerator and prevent the at least a portion of the first workload from execution on the second accelerator;

access respective performance metrics corresponding to execution of the first workload from one or more of the first accelerator and the second accelerator;
a neural network trainer to train a machine learning model based on an association between the first attribute and the respective performance metrics; and
a neural network processor to process, using the machine learning model, the second attribute to select one of the first accelerator or the second accelerator to execute the second workload.

2. The apparatus of claim 1, wherein:
the first attribute represents whether the first workload can be parallelized; and
the accelerator selection processor is further to, in response to the first attribute representing the first workload can be parallelized, cause at least a portion of the first workload to be executed by both the first accelerator and the second accelerator.

3. The apparatus of claim 1, wherein:
the first attribute represents whether the first workload requires a threshold amount of resources; and
the accelerator selection processor is further to, in response to the first attribute representing the first workload requires a threshold amount of resources, cause at least a portion of the first workload to be executed by both the first accelerator and the second accelerator.

4. The apparatus of claim 1, wherein:
the first attribute represents whether the first workload is associated with image processing; and
the accelerator selection processor is further to, in response to the first attribute representing the first workload is associated with image processing, cause at least a portion of the first workload to be executed by both the first accelerator and the second accelerator.

5. The apparatus of claim 1, wherein:
the first attribute represents whether the first workload is associated with text processing; and
the accelerator selection processor is further to, in response to the first attribute representing the first workload is associated with text processing, cause at least a portion of the first workload to be executed by both the first accelerator and the second accelerator.

6. The apparatus of claim 1, further including an accelerator interface to provide the second workload to the selected one of the first accelerator or the second accelerator for execution.

7. The apparatus of claim 6, further including a workload interface to provide a result of the execution of the second workload to a workload provider.

8. The apparatus of claim 6, wherein:
the accelerator selection processor is to access a performance metric associated with execution of the second workload at the selected one of the first accelerator or second accelerator, and
subsequent training of the machine learning model is further based on the performance metric and the second attribute of the second workload.

9. The apparatus of claim 1, wherein the respective performance metrics represent execution times of the first workload at the corresponding one of the first accelerator or second accelerator.

10. The apparatus of claim 1, wherein the first accelerator is a central processing unit based accelerator and the second accelerator is a field programmable gate array based accelerator.

11. At least one non-transitory machine-readable medium comprising instructions that, when executed, cause at least one processor to at least:
identify a first attribute of a first workload, the first attribute representing whether the first workload would cause a second accelerator to access memory in an amount of time less than a threshold latency;
in response to the first attribute representing that the first workload would cause the second accelerator to access memory in an amount of time less than a threshold latency, cause at least a portion of the first workload to be executed by both a first accelerator and the second accelerator;
in response to the first attribute representing that the first workload would cause the first accelerator to access memory in an amount of time greater than the threshold latency, cause at least a portion of the first workload to be executed by the first accelerator and prevent the at least a portion of the first workload from execution on the second accelerator;
access respective performance metrics corresponding to execution of the first workload from one or more of the first accelerator and the second accelerator;
train a machine learning model based on an association between the first attribute and the respective performance metrics;
identify a second attribute of a second workload; and
process, using the machine learning model, the second attribute to select one of the first accelerator or the second accelerator to execute the second workload.

12. The at least one non-transitory machine readable medium of claim 11, wherein:
the first attribute represents whether the first workload can be parallelized; and
the instructions, when executed, cause the at least one processor to, in response to the first attribute representing the first workload can be parallelized, cause at least a portion of the first workload to be executed by both the first accelerator and the second accelerator.

13. The at least one non-transitory machine readable medium of claim 11, wherein:
the first attribute represents whether the first workload requires a threshold amount of resources; and
the instructions, when executed, cause the at least one processor to in response to the first attribute representing the first workload requires a threshold amount of resources, cause at least a portion of the first workload to be executed by both the first accelerator and the second accelerator.

14. The at least one non-transitory machine readable medium of claim 11, wherein:
the first attribute represents whether the first workload is associated with image processing; and
the instructions, when executed, cause the at least one processor to in response to the first attribute representing the first workload is associated with image processing, cause at least a portion of the first workload to be executed by both the first accelerator and the second accelerator.

15. The at least one non-transitory machine readable medium of claim 11, wherein:
the first attribute represents whether the first workload is associated with text processing; and
the instructions, when executed, cause the at least one processor to in response to the first attribute representing the first workload is associated with text processing, cause at least a portion of the first workload to be executed by both the first accelerator and the second accelerator.

16. The at least one non-transitory machine readable medium of claim 11, wherein the instructions, when executed, cause the at least one processor to provide the second workload to the selected one of the first accelerator or the second accelerator for execution.

17. The at least one non-transitory machine readable medium of claim 16, wherein the instructions, when executed, cause the at least one processor to provide a result of the execution of the second workload to a workload provider.

18. The at least one non-transitory machine readable medium of claim 16, wherein:
the instructions, when executed, cause the at least one processor to access a performance metric associated with execution of the second workload at the selected one of the first accelerator or second accelerator; and
subsequent training of the machine learning model is further based on the performance metric and the second attribute of the second workload.

19. The at least one non-transitory machine readable medium of claim 11, wherein the respective performance metrics represent execution times of the first workload at the corresponding one of the first accelerator or second accelerator.

20. The at least one non-transitory machine readable medium of claim 11, wherein the first accelerator is a central processing unit based accelerator and the second accelerator is a field programmable gate array based accelerator.

21. A method to execute a workload, the method comprising:
identifying a first attribute of a first workload, the first attribute representing whether the first workload would cause a second accelerator to access memory in an amount of time less than a threshold latency;
in response to the first attribute representing that the first workload would cause the second accelerator to access memory in an amount of time less than a threshold latency, causing at least a portion of the first workload to be executed by both a first accelerator and the second accelerator;
in response to the first attribute representing that the first workload would cause the first accelerator to access memory in an amount of time greater than the threshold latency, causing at least a portion of the first workload to be executed by the first accelerator and preventing the at least a portion of the first workload from execution on the second accelerator;
accessing respective performance metrics corresponding to execution of the first workload from one or more of the first accelerator and the second accelerator;
training a machine learning model based on an association between the first attribute and the respective performance metrics;
identifying a second attribute of a second workload; and
processing, using the machine learning model, the second attribute to select one of the first accelerator or the second accelerator to execute the second workload.

22. The method of claim 21, wherein the first attribute represents whether the first workload can be parallelized, and further including, in response to the first attribute representing the first workload can be parallelized, causing at least a portion of the first workload to be executed by both the first accelerator and the second accelerator.

23. The method of claim 21, wherein the first attribute represents whether the first workload requires a threshold amount of resources, and further including in response to the first attribute representing the first workload requires a threshold amount of resources, causing at least a portion of the first workload to be executed by both the first accelerator and the second accelerator.

24. The method of claim 21, wherein the first attribute represents whether the first workload is associated with image processing, and further including, in response to the first attribute representing the first workload is associated with image processing, causing at least a portion of the first workload to be executed by both the first accelerator and the second accelerator.

25. The method of claim 21, wherein the first attribute represents whether the first workload is associated with text processing, and further including, in response to the first attribute representing the first workload is associated with text processing, causing at least a portion of the first workload to be executed by both the first accelerator and the second accelerator.

26. The method of claim 21, further including providing the second workload to the selected one of the first accelerator or the second accelerator for execution.

* * * * *